（12）United States Patent
Best et al.

(10) Patent No.: US 7,930,447 B2
(45) Date of Patent: Apr. 19, 2011

(54) LISTING WINDOWS OF ACTIVE APPLICATIONS OF COMPUTING DEVICES SHARING A KEYBOARD BASED UPON REQUESTS FOR ATTENTION

(75) Inventors: Steven F. Best, Acton, MA (US); Robert J. Eggers, Jr., Austin, TX (US); Janice M. Girouard, Austin, TX (US); Brian P. Sobocinski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 12/196,619

(22) Filed: Aug. 22, 2008

(65) Prior Publication Data

US 2010/0049890 A1 Feb. 25, 2010

(51) Int. Cl.
*G06F 13/00* (2006.01)
*G06F 3/00* (2006.01)
(52) U.S. Cl. .......................... 710/33; 710/15
(58) Field of Classification Search .............. 710/15, 710/73
See application file for complete search history.

(56) References Cited

U.S. PATENT DOCUMENTS

| 5,491,795 | A | * | 2/1996 | Beaudet et al. | 715/804 |
| 5,835,088 | A | * | 11/1998 | Jaaskelainen, Jr. | 715/803 |
| 6,408,064 | B1 | * | 6/2002 | Fedorov et al. | 379/265.06 |
| 6,633,905 | B1 | | 10/2003 | Anderson et al. | |
| 6,662,310 | B2 | | 12/2003 | Lopez et al. | |
| 6,681,250 | B1 | * | 1/2004 | Thomas et al. | 709/226 |
| 7,349,956 | B2 | | 3/2008 | Anderson et al. | |

FOREIGN PATENT DOCUMENTS

CA 2134712 10/1994

OTHER PUBLICATIONS

Hrvoje Benko, et al., "Multi-Monitor Mouse," ACM, CHI 2005, Apr. 2-7, 2005, Portland, Oregon, p. 4.
Caspar Boekhoudt, "The Big Bang Theory of IDEs," *Power*, vol. 1, No. 7, Oct. 2003, p. 11.
Karen Renaud, et al., "Making Sense of Low-Level Usage Data to Understand User Activities," Proceedings of SAICSIT 2004, p. 10.

* cited by examiner

*Primary Examiner* — Henry W Tsai
*Assistant Examiner* — Juanito C Borromeo
(74) *Attorney, Agent, or Firm* — Stephen J. Walder, Jr.; Libby Z. Toub

(57) ABSTRACT

Methods and arrangements of monitoring applications active on a plurality of computers are discussed. Embodiments include transformations, code, state machines or other logic to connect a plurality of computing devices via a keyboard video mouse (KVM) switch and to detect applications active on the computing devices. In some embodiments, each computing device may be connected to a display separate from the KVM switch. The embodiment may include detecting applications signaling a user for attention and displaying a list of active applications of the plurality of computing devices in response to a command from the user. The displaying may include giving priority to the applications signaling a user for attention.

17 Claims, 5 Drawing Sheets

LISTING WINDOWS OF ACTIVE APPLICATIONS OF COMPUTING DEVICES SHARING A KEYBOARD BASED UPON REQUESTS FOR ATTENTION

BACKGROUND OF THE INVENTION

The present invention is in the field of computing devices with a shared keyboard. More particularly, the present invention relates to methods and arrangements to present a list of windows of active applications, giving priority to applications based upon their signaling for attention.

Today, users may have multiple displays per system. Because computing resources are now exceptionally inexpensive, people may also utilize more than one personal computer for work and for play. In order to maximize desk real estate, these users may share a single keyboard and mouse for their multiple machines, either with a hardware solution such as multi-port keyboard-video-mouse (KVM) switches, or through the use of network-based keyboard buffer sharing software. This explosion of hardware has led to the use of keystrokes to manage window focus, such as the ALT TAB keystroke. In response to this keystroke combination, the user may be presented with a list of windows generated by active applications on the computers sharing the keyboard. The user may cycle through them by, for example, holding down the ALT key and repeatedly striking the TAB key, to select a window to be given focus. The mouse/cursor may be moved to the window that was selected. In some examples of this function, the windows may be presented in order of task execution. The presentation may be grouped by class of applications (all browsers) or may be restricted to specific applications (only browser windows).

BRIEF SUMMARY OF THE INVENTION

A method and arrangement of monitoring applications active on a plurality of computers are presented. One embodiment provides a method of monitoring applications active on a plurality of computers. The embodiment may involve connecting a plurality of computing devices via a keyboard video mouse (KVM) switch and detecting applications active on the computing devices. The embodiment may include detecting applications signaling a user for attention and displaying a list of active applications of the plurality of computing devices in response to a command from the user. The displaying may include giving priority to the applications signaling a user for attention.

BRIEF DESCRIPTION OF THE SEVERAL VIEWS OF THE DRAWINGS

An explanation of the invention will become apparent upon reading the following detailed description and upon reference to the accompanying drawings in which like references may indicate similar elements.

DETAILED DESCRIPTION OF THE INVENTION

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of monitoring applications active on a plurality of computers are contemplated. Embodiments include transformations, code, state machines or other logic to connect a plurality of computing devices via a keyboard video mouse (KVM) switch and to detect applications active on the computing devices. The embodiment may include detecting applications signaling a user for attention and displaying a list of active applications of the plurality of computing devices in response to a command from the user. The displaying may include giving priority to the applications signaling a user for attention.

While specific embodiments will be described below with reference to particular circuit or logic configurations, those of skill in the art will realize that embodiments of the present invention may advantageously be implemented with other substantially equivalent configurations.

Figure 1:
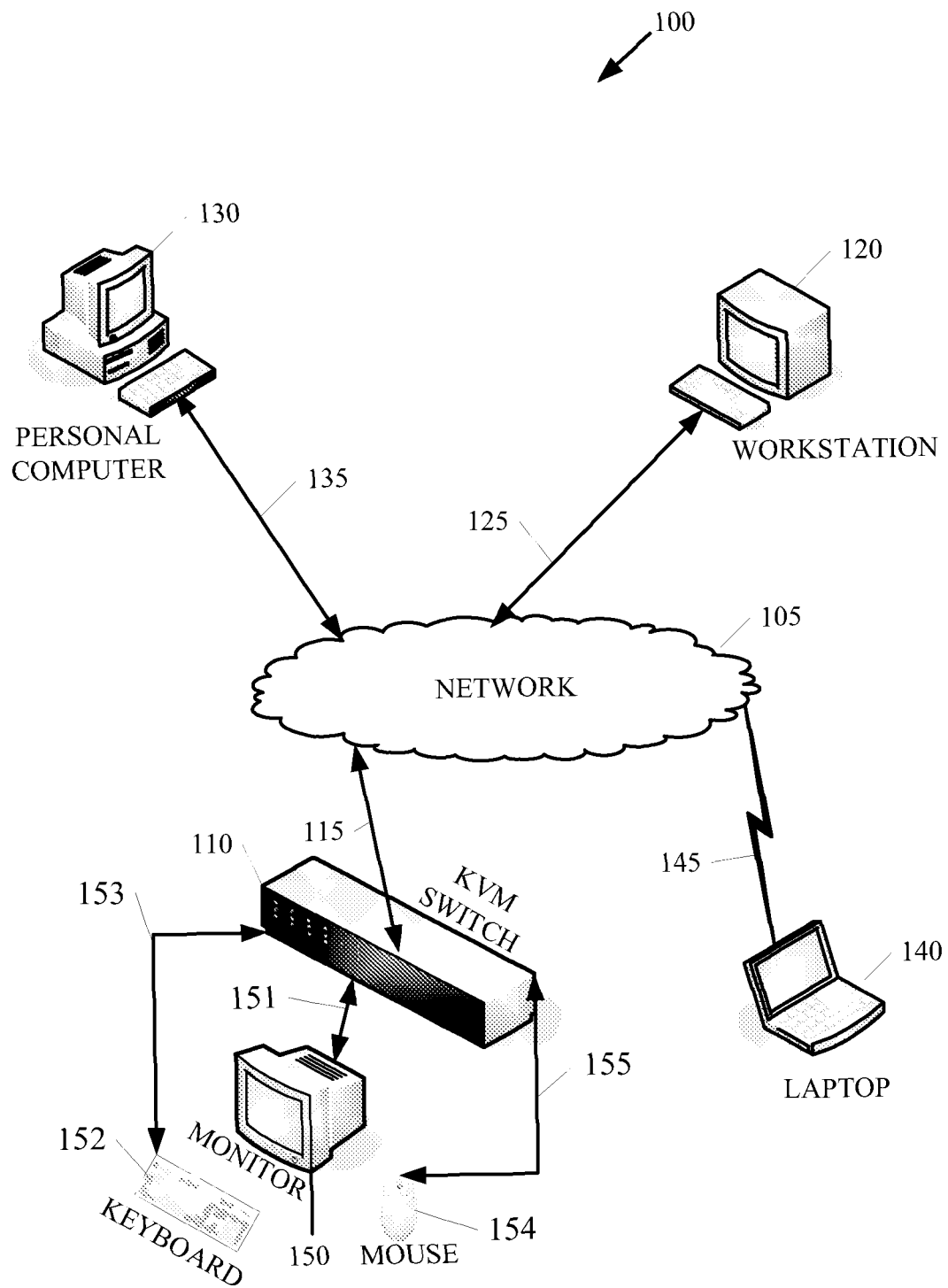
FIG. 1 depicts an embodiment of a networked system of devices capable of monitoring applications active on a plurality of computers.

FIG. 1 depicts a diagram of an embodiment of a networked system 100 of devices capable of monitoring applications active on a plurality of computers. The system 100 includes a network 105, keyboard-video-mouse (KVM) switch 110 connected to network 105 through connection 115, and a variety of computing devices, including:

workstation 120, a computer coupled to network 105 through wireline connection 125, personal computer 130, coupled to network 105 through wireline connection 135, and laptop computer 140, coupled to network 105 through wireless connection 145.

KVM switch 110 may enable a user to switch control from one to another of the computing devices 120, 130, and 140. By entering commands, such as pressing buttons or using a keyboard command, a user may specify the computing device to receive signals from keyboard 152 and mouse 154 and to transmit video signals from the computing devices to monitor 150 ("set the KVM switch to the computing device"). In many embodiments, KVM switch 110 may switch control from one computing device to another electronically. In these embodiments, KVM switch 110 may use a dedicated microcontroller. In a few embodiments, KVM switch 110 may switch control mechanically, via physical switch contacts. KVM switch 110 also relays data entered into the input devices 152 and 154 to the computing devices 120, 130 and 140; and relays output for display between the computing devices 120, 130, and 140 and the monitor 150.

In the embodiment of FIG. 1, keyboard cable 153 may consist of USB cable, PS/2 cable or other forms of cable known to those of skill in the art. Mouse cable 155 may consist of USB cable, RS-232, PS/2, ADB, or other forms of cable known to those of skill in the art. Monitor cable 151 may consist of VGA cable or other cable known to those of skill in the art.

Network 105, which may consist of the Internet or another wide area network, a local area network, or a combination of networks, may provide data communications between KVM switch 110 and the computing devices 120, 130, and 140 for the transmission to the computing devices of keyboard and mouse signals captured by KVM switch 110 and the transmission of video signals from the computing devices 120, 130, and 140. In some embodiments, switch 110 may receive the mouse and keyboard signals and convert them into packets for transmission to the computing devices 120, 130, and 140.

The devices 120, 130, and 140 may run applications which generate windows. The applications may request attention from the user; that is, attempt to attract the user's notice. For example, an application may request a name for a file, verify that a user wants to delete or close a file, or inform the user that a new email or instant message has arrived. To request attention, the program may issue a command to generate an audio or visual request for attention. The command may consist of a system call to flash an application window or to flash an icon representing the application on the title bar.

A user may enter a command using input devices 152 and 154 requesting a listing of the windows generated by the active applications of the computing devices 120, 130, and 140. For example, the user may enter ALT-TAB in keyboard 152. In response, KVM switch 110 may list the active applications in the computing devices 120, 130, and 140. In further embodiments, the list may include the windows produced by the applications. To produce the list, KVM switch 110 may obtain from each of the computing devices 120, 130, and 140 a list of windows. Software running on KVM switch 110 (server software) may connect with software on each of the computing devices 120, 130, and 140 (client software) to obtain the list. The client software may for example, make a system call requesting a list of active processes and their windows.

In some embodiments, in response to the command, the KVM switch 110 may poll each computing device for its active applications and windows. In other embodiments, the computing devices may periodically report on their active applications and windows. The report may consist of a complete list or an update from a previous list. In further embodiments, in response to the user command to produce the list, the KVM switch 110 may request the latest updates from each of the computing devices.

KVM switch 110 may also obtain from the computing devices 120, 130, and 140 a list of applications which are currently requesting attention. In the list of active applications or active applications and their windows KVM switch 110 may give priority to applications or windows of applications that are currently signaling for attention. In some embodiments, the computing devices 120, 130, and 140 may timestamp the requests for attention, and KVM switch 110 may order the windows of the application by timestamp. In some embodiments, client software may intercept system calls requesting the user's attention and may timestamp them. The client software may also intercept calls to end the requests for attention. When the server software requests information about the windows of active processes, the client software may transmit the information over network 105.

The arrangement of KVM switch 110, computing devices 120, 130, and 140, KVM 150, 152, and 154 and other devices making up the exemplary system 100 illustrated in FIG. 1 is for explanation, not for limitation. In some embodiments, a hardware KVM switch may be omitted and the functions of KVM switch 110 performed by software in one of the computing devices 120, 130, or 140 or in a server. Software that performs the functions of a hardware KVM switch includes Input Director, Synergy, Virtual Network Computing (VNC), Multiplicity, MaxiVista, Kavoom![1], and PC Anywhere.

In a few embodiments, a cell phone, personal digital assistant (PDA) or other computing device may be connected to a KVM switch. The connection may enable the computing device to be controlled by a full keyboard and a mouse. In many embodiments, the switch may be connected only to a mouse and keyboard and not to a monitor. In further embodiments, each computing device may be connected to its own monitor or monitors and may display output on its own monitor or monitors. The KVM switch may allow a user to control the computing from the mouse and keyboard connected to the switch. In other embodiments, sound as well as video may be ported from the computing devices to the KVM switch or the computer executing KVM software. The porting of sound may enable a remote user to hear alerts from applications requesting the user's attention.

In several embodiments, the keyboard, mouse, and monitor may be connected to the KVM switch over the Internet or other wide area network. This connection between input and output devices and the KVM is known as KVM over IP. It may capture video, convert it into packets, and send the packets over an Ethernet link to a remote console application. Similarly, it may receive packets representing mouse and keyboard events over the Internet, and may forward them to the computing devices.

Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

In some embodiments of the invention, a single computing device may be directly connected to a keyboard and mouse. A KVM switch or KVM software may be omitted. In these embodiments, for example, a single computing device such as a workstation or personal computer may be connected to multiple monitors. In response to a user command to list windows of active applications, the computing device may provide the list, giving priority to applications that are signaling for attention. The list display may make the user aware of an application's requesting attention. The user, for example, may not have noticed a flashing window on one monitor because he was viewing another monitor.

In other embodiments, a KVM switch may be directly connected to each of the computing devices. In further embodiments, the KVM switch may communicate with a computing device connected to it only when the KVM switch is set to the computing device. In these embodiments, it may be necessary to set the KVM switch to each of the computing devices in order to obtain a list of the active applications and the applications signaling for a user's attention.

Figure 2:
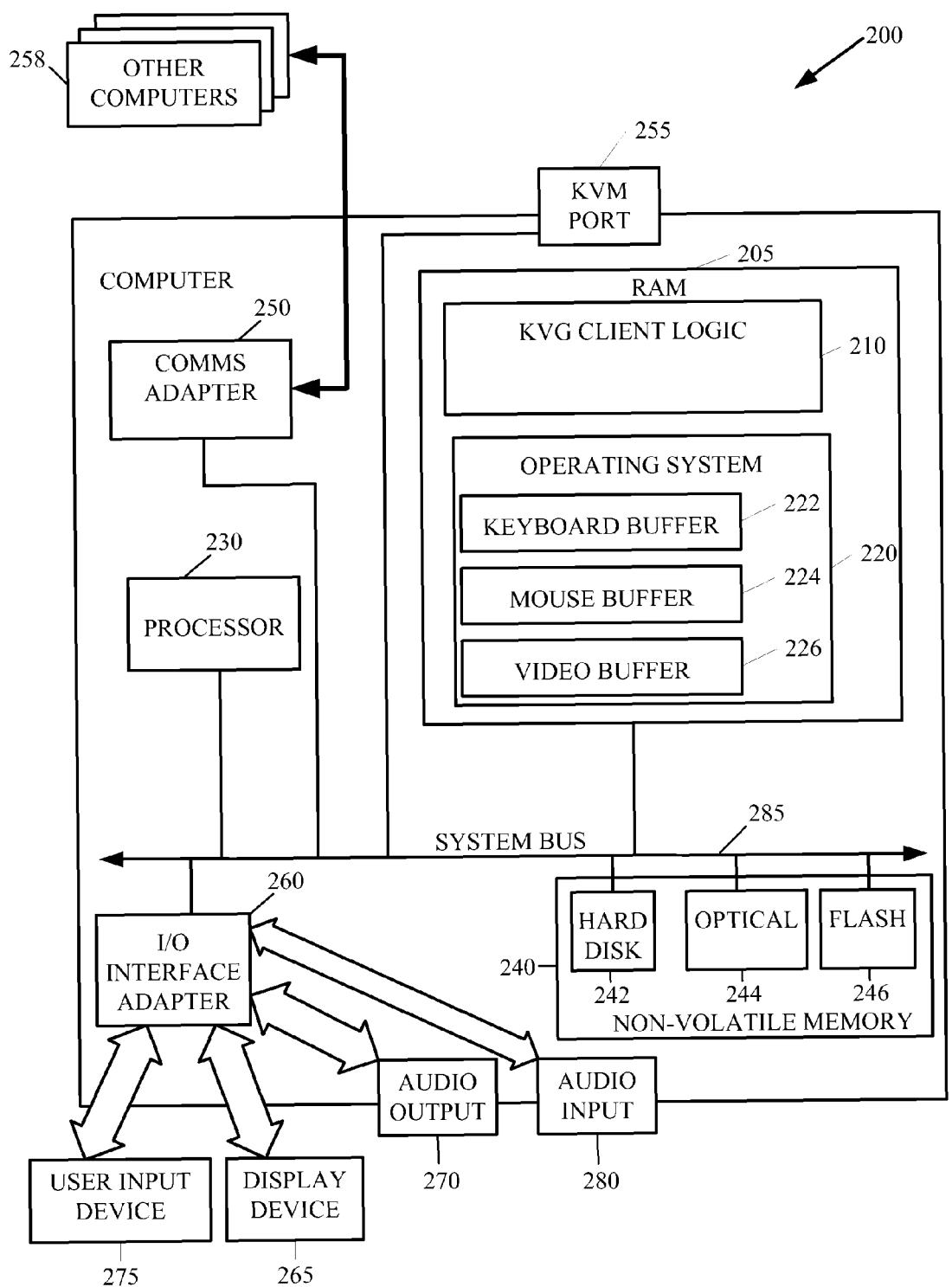
FIG. 2 depicts an embodiment of a computer capable of monitoring applications active on a plurality of computers.

Turning to FIG. 2, depicted is an embodiment of a computer 200 that includes random access memory (RAM) 205, a processor 230 or CPU, non-volatile memory 240, a communications adapter 250, a KVM port 255, and an Input/Output (I/O) interface adapter 260 connected by system bus 285. Stored in RAM 205 is KVM client logic 210 and operating system 220.

KVM client logic 210 may comprise computer program instructions to process commands received from a KVM switch. KVM client logic 210 may obtain a list of windows of active applications. KVM client logic 210 may, for example, issue a request process list system call. KVM client logic 210 may also track requests for a user's attention by the active processes. KVM client logic 210 may, for example, intercept system calls to produce an audio signal, to flash a window, or to flash an icon representing an application on the title bar. In some embodiments, KVM client logic 210 may timestamp the requests for a user's attention.

KVM logic 210 may also determine that a user has responded to a request for attention by an application. The request for attention may be terminated. The application may, for example, have stopped flashing an icon or a window. In addition, the user may have performed an action in response to the request. The user may, for example, have clicked a button to consent to a file deletion or opened a new email or instant message. In some embodiments, a KVM client logic 210 may use a cut-off interval, for example, treating a request for attention signaled by an audio signal as no longer active after a certain period. KVM logic 210 may transmit to a KVM switch information about the windows of active applications and the requests for attention. In some embodiments, KVM client logic 210 may also transmit timestamp information about the requests for attention.

In many embodiments, KVM logic 210 may receive a command from a KVM to control computer 200 from input devices attached to the KVM switch. KVM client logic 210 may receive signals representing mouse events and keyboard events, and may insert data representing the events in keyboard buffer 222 and mouse buffer 224 for processing by operating system 220. KVM client logic 210 may also disconnect the buffers from user input device 275. In some embodiments, KVM client logic 210 may also transmit the data from video buffer 226 to the KVM switch for display by a monitor connected to the KVM switch. KVM client logic 210 may also receive a command to give focus to a window of an application active on computer 200. KVM client logic 210 may then give a signal call to operating system 220 to give focus to the window.

Operating system 220 includes keyboard buffer 222, mouse buffer 224, and video buffer 226. Buffers 222, 224, and 226 may hold data until they are processed. For example, the keyboard buffer 222 may hold data representing keyboard events until the data is processed. Operating system 220 may comprise UNIX™, Linux™, Microsoft Windows™, AIX™, IBM's i5/OS™, or other operating systems useful for monitoring applications active on a plurality of computers as will occur to those of skill in the art. KVM client logic 210 and operating system 220 (components of software) are shown in RAM 205 in FIG. 2, but many components of such software may be stored in non-volatile memory 240 also. Further, while the components of such are shown simultaneously present in RAM, in some other embodiments, only some of the components of RAM 205 may be present at any given time.

The modules shown in RAM 205 are for explanation, not for limitation. In many other embodiments, some or all of buffers 222, 224, and 226 may be components of KVM client logic 210. In some embodiments, KVM client logic 210 may be a component of operating system 220.

Non-volatile computer memory 240 may be implemented as a hard disk drive 242, optical disk drive 244, electrically erasable programmable read-only memory space (EEPROM or Flash memory) 246, RAM drives (not shown), or as any other kind of computer memory as will occur to those of skill in the art. Communications adapter 250 may implement the hardware level of data communications between computer 200 and other computers, such as other computers 258 The data communications may occur directly or through a network and may include communicating with a virtual world server or web service server. Such data communications may be carried out through serially through RS-232 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, and 802.11a/b/g/n adapters for wireless network communications.

KVM switch port 255 provides an interface between computer 200 and a KVM switch. KVM switch port 255 may comprise a standard interface, such as a USB jack, an RS-232 or other network jack, a wireless connection, a mouse connection, a keyboard connection, a video connection, or other connections as many occur to those of skill in the art. In the embodiment of FIG. 2, only one connection is shown. In other embodiments, a KVM switch may be connected to a computer through multiple connections. The connection may, for example, include a mouse, keyboard, video, and network connection.

I/O interface adapter 260 implements user-oriented I/O through, for example, software drivers and computer hardware for controlling output to display devices such as display device 265 and audio output device 270 as well as user input from user input device 275 and audio input device 280. User input device 275 may include both a keyboard and a mouse. Some embodiments may include other user input devices such as speech interpreters, bar code scanners, text scanners, tablets, touch screens, and/or other forms of user input devices. In many embodiments, computer 200 may disregard input entered through the display devices when a KVM switch is set to computer 200. Computer 200 will then be receiving input from the input devices attached to the KVM switch. Audio output 270 may include speakers or headphones and audio input device 280 may include a microphone or other device to capture sound.

The computer and components illustrated in FIG. 2 are for explanation, not for limitation. Other embodiments may include embedded systems, PDAs, cell phones, BlackBerries® and other computing devices which can be controlled by a keyboard and mouse connected to a KVM switch. Some embodiments may omit a user input device or devices. A few embodiments may omit a display device. In these devices, the computing device may receive input only from input devices connected to a KVM switch. Many embodiments may omit a display device. Display data may be transmitted to a monitor or other display device connected to a KVM switch. In several embodiments, a computing device may contain two or more processors. In various embodiments, a computing device may use point-to-point interconnects to connect processors or to connect a processor and another element of the computing system.

Figure 3:
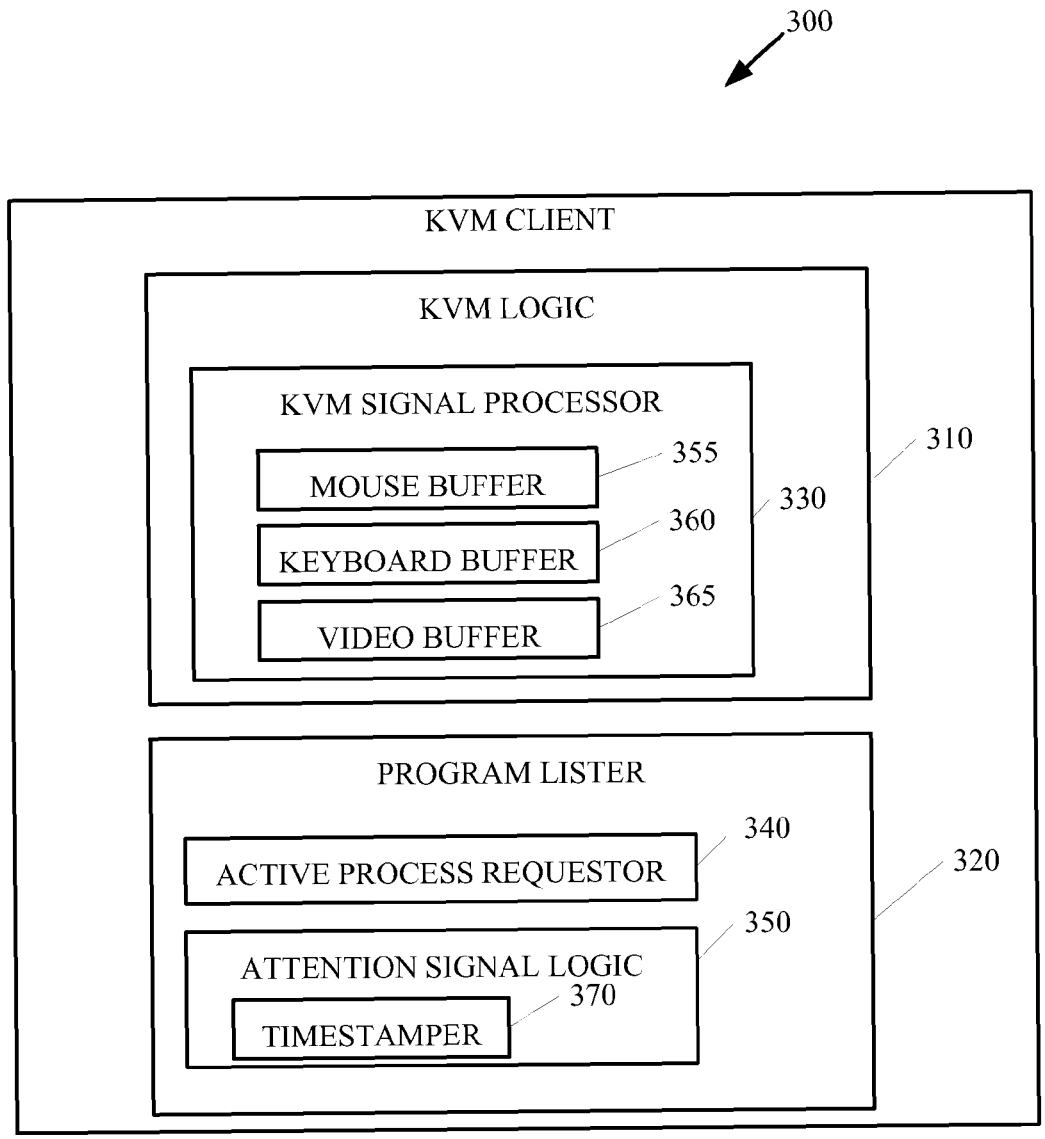
FIG. 3 depicts an embodiment of an apparatus to monitor applications active on a plurality of computers.

Turning to FIG. 3, disclosed is a block diagram illustrating an exemplary KVM client apparatus 300, a component of a computing device. KVM client apparatus 300 may receive data and command from a KVM switch, process the data, respond to the commands, and transmit data to the KVM switch. KVM client apparatus 300 includes KVM logic 310 and program lister 320.

KVM logic 310 may communicate with a KVM switch. It may receive commands from the KVM switch and execute them. It may also distinguish between data transmitted by the KVM switch and KVM commands. KVM signal processor 330 may receive data from input devices connected to the KVM switch, such as data about mouse and keyboard events, and send the data to an operating system or other module of the computing device for processing. In addition, KVM signal processor 330 may receive video data from applications executing on the computing device and may transmit the data to the KVM switch for display on a monitor or other display device connected to the KVM switch. KVM signal processor 330 includes mouse buffer 355, keyboard buffer 360, and video buffer 365. The buffers may hold input/output data until it can be processed.

Program lister 320 may gather information used by a KVM switch to list the windows of active applications on computing devices connected to the KVM switch. The listing may give priority to windows of applications that are requesting attention from the user. Active process requester 340 may obtain a list of active applications on the computing device, for instance, by issuing a request for such a list from an operating system. Active process requester 340 may also obtain a list of the windows of the active applications. It may, for example, obtain a list of windows from an operating system.

Attention signal logic 350 may generate a list of applications on the computing device which are signaling for the attention of a user. In some embodiments, attention signal logic 350 may intercept the system calls used to signal for a user's attention. The signal calls may, for example, produce an alert sound or flash a window or icon of an application or window on the title bar. Time stamper 370 may label each request for a user's attention on the list with the time of the request.

The module of FIG. 3 is for illustration and not limitation. An apparatus for monitoring applications active on a plurality of computers in accordance with embodiments of the invention may omit some of the modules shown, may include additional modules, or may contain different arrangements of modules. In other embodiments, some of the functions of a KVM logic and a program lister may be differently divided, or may be contained in other modules, as may occur to those of skill in the art.

Figure 4:
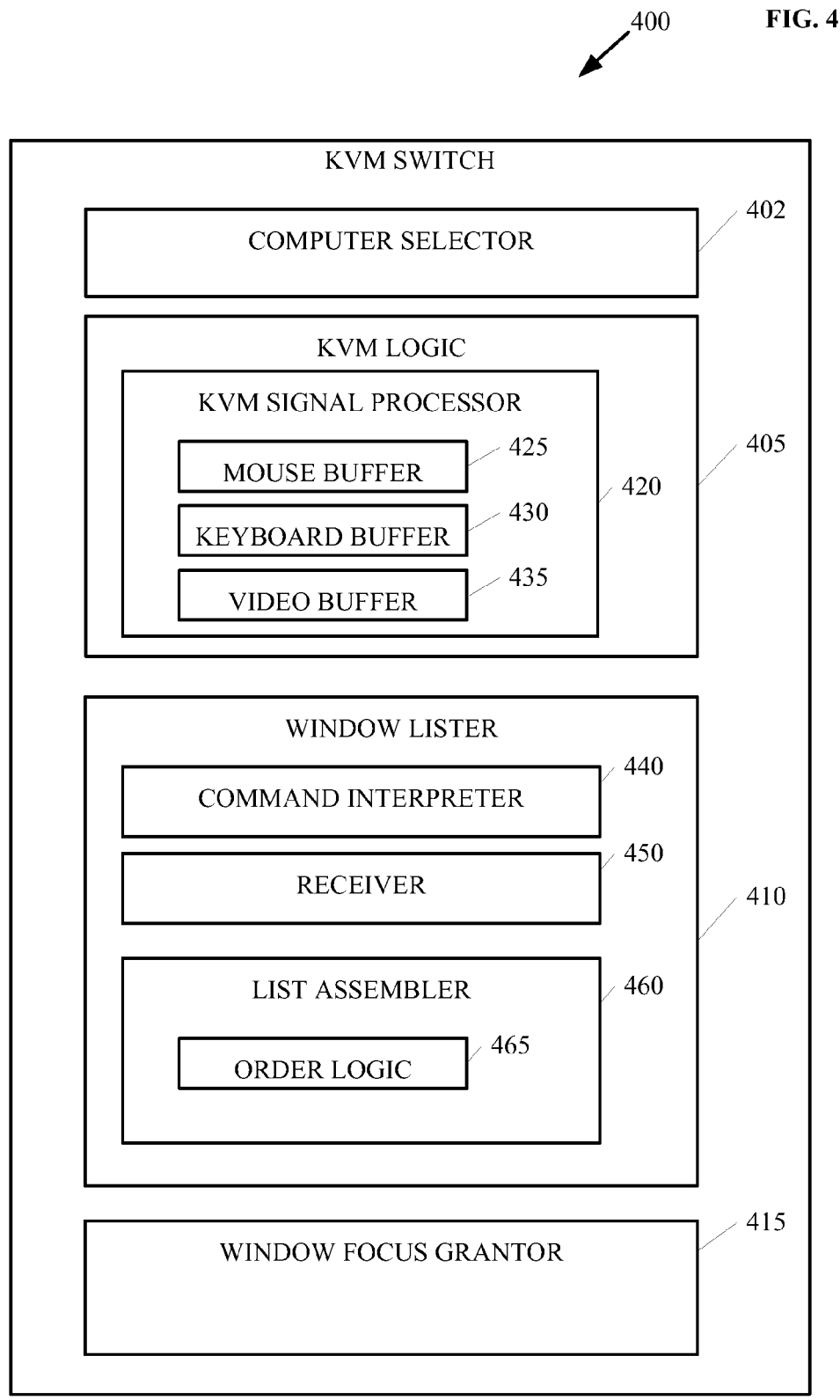
FIG. 4 depicts another embodiment of an apparatus to monitor applications active on a plurality of computers.

FIG. 4 depicts a block diagram illustrating an exemplary KVM switch apparatus 400. KVM switch apparatus 400 may comprise a stand-alone device or a component of a computing device. KVM switch apparatus 400 may be connected to one or more input devices such as a mouse and keyboard; to one or more output devices, such as a monitor; and to a plurality of computing devices.

Computer selector 402 may be able to select one of the computing devices and transmit signals from the input devices to the computing device for processing. The signals may generally be treated as input by the computing device, and used to control applications running on the computing device. When selected, the computing device may disregard signals entered into similar input devices attached to the computing device. The computing device may, for instance, disregard signals entered into a mouse directly attached to it. Similarly, signals to generate a display on a display device may be transmitted to the KVM switch apparatus 400 and displayed on a monitor or other display device attached to it.

KVM logic 405 controls the flow of signals from input devices attached to KVM switch 400 to the computing devices, and from the computing devices to display devices attached to KVM switch 400. KVM logic 405 may determine whether a signal received from a KVM switch input device is input for the computing device selected by computer selector 402 or is a command to the KVM switch 400.

KVM logic 405 includes KVM signal processor 420. KVM signal processor 420 receives input signals from the input devices attached to KVM switch 400, stores them in buffers as necessary, and forwards them to the selected computing device for processing. It also receives video signals from the computing device and transmits them to a display device attached to the KVM switch for display. The buffers include mouse buffer 425, for storing mouse signals; keyboard buffer 430, for storing keyboard signals; and video buffer 435, for storing video signals.

Window lister 410 may generate a list of windows of active applications on the computing devices connected to KVM switch 400. The list may be generated in response to a user command, such as the ALT-TAB key combination. Window lister 410 includes command interpreter 440, receiver 450, and list assembler 460. Command interpreter 440 determines whether user interaction with KVM switch 400 constitutes a command. The user may, for example, provide enter data through input devices connected to KVM switch 400. In addition, hardware versions of KVM switch 400 may have buttons or other controls separate from the input devices that may be manipulated by a user.

Receiver 450 may receive a list of active applications and their windows from the computing devices attached to KVM switch 400. The applications that are requesting attention from a user may be time stamped. List assembler 460 may assemble the lists from the computing devices. Order logic 465 may give priority to applications which are signaling attention from the user. In further embodiments, order logic 465 may order applications based upon a time stamp of signaling attention. In some further embodiments, an application that signaled more recently may be placed ahead of an application that signaled that signaled earlier. In other further embodiments, the earlier signaling application may be placed ahead of the less recently signaling application. In a few further embodiments, window lister 410 may emphasize or make more noticeable the windows of applications signaling for attention. Window lister 410 may, for example, use a bright color for the border of icons representing these windows or may flash them.

Window focus grantor 415 may grant focus to a window selected by a user from the list provided by window lister 410. In some embodiments, for example, the user may hit the ALT-TAB key combination, and repeatedly strike the TAB key until the desired window is found. In some embodiments, window focus grantor 415 may issue a command to KVM client software on the computing device on which the window is generated. The client software may issue a system call to the operating system of the computing device to grant focus. In other embodiments, KVM switch 400 may transmit a signal to the computing device representing a mouse click on the desired window. In many embodiments, window focus grantor 415 may also select the computing device of the window. In other embodiments, such as embodiments with a mechanical KVM switch, the user may be required to manually select the desired computing device via KVM switch 400 before KVM switch 400 may grant focus to the desired window.

In some embodiments, a KVM switch such as KVM switch 400 may make it easier for a user to notice applications' signals for attention and to respond to the signals. Through a single monitor connected to the KVM switch, the user may be controlling several computers and many applications. The user may not be aware an application on one of the computers is trying to signal for attention, because the monitor is switched to another computer. To check for signals for attention in embodiments of the invention, the user may issue a command to the KVM switch for a listing of windows. The user may then grant focus to the window of the applications whose windows were given priority, checking whether the applications are signaling for attention.

Figure 5:
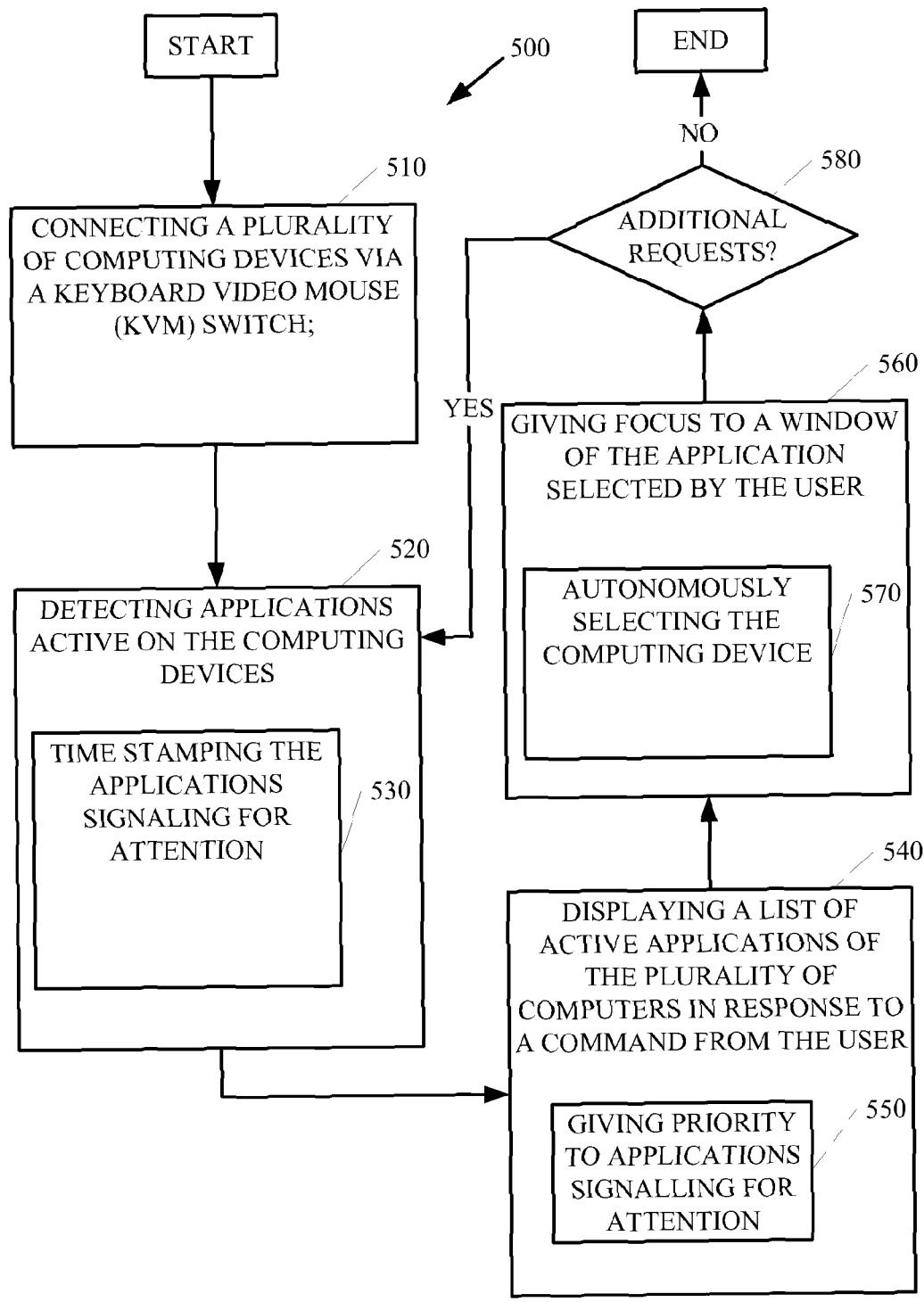
FIG. 5 depicts a flowchart of an embodiment of a method to monitor applications active on a plurality of computers.

FIG. 5 depicts an embodiment of a flowchart 500 of an embodiment of a method to develop a user profile in a virtual world. Flowchart 500 of FIG. 5 begins with connecting two or more computing devices via a KVM switch (element 510). The KVM switch may be connected to one or more input devices and may be connected to one or more output devices.

The method may include detecting applications active on the computing devices (element 520). The detecting may include combining lists of applications active on each of the computing devices. The method may include time stamping the entries for applications signaling for attention (element 530).

The method may include displaying a list of active applications on the computing devices in response to a command from the user (element 540). In many embodiments, the display may include the windows generated by those applications. In some embodiments, the user command may be given by a keyboard combination. The display may include giving priority to applications signaling for attention (element 550). For example, if the list is presented linearly, the signaling applications may be presented first. In tables, entries representing these applications may be given priority by being placed in the table consecutively starting in a prominent position, such as the top left hand entry. In further embodiments, the signaling applications may be time stamped and presented in order of stamp, with the most recent first. The other applications may be presented after the signaling applications, and may be ordered by any method that may occur to those of skill in the art.

The method also includes giving focus to a window of the application selected by the user (element 560). In some embodiments, the user may select a window from the windows of the application presented by the KVM switch. In other embodiments, the user may select an application and the KVM switch may grant focus to a window from the application. The KVM switch may also autonomously select the computing device running the application (element 570). If there are additional requests for listings from the user (element 580), elements 520 through 570 of FIG. 5 may be repeated. Otherwise, the method of FIG. 5 may end.

The elements of flowchart 500 are for illustration and not for limitation. In alternative embodiments, additional elements may be included, some of the elements of flowchart 500 may be omitted, or the elements may be performed in a different order. In some embodiments, the user may be required to manually set the KVM switch to select the computing device running the selected application. Some embodiments may omit time stamping and ordering the applications by time stamp.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for monitoring applications active on a plurality of computers, the computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for monitoring applications active on a plurality of computers. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of monitoring applications active on a plurality of computing devices, the method comprising:
   connecting a plurality of computing devices via a keyboard video mouse (KVM) switch;
   for each computing device, detecting applications active on the computing device, thereby creating a list of applications of the computing device, the detecting comprising:
  the KVM switch automatically detecting applications requesting attention from a user; and
  time stamping the requesting attention from a user; and
displaying a list of active applications of the plurality of computing devices in response to a command from the user, the list combining the lists of applications of each of the computing devices, wherein the displaying comprises:
  the KVM switch automatically giving priority to the applications requesting attention from the user, the giving priority comprising ordering the display by the time stamping of the requesting attention.

2. The method of claim 1, further comprising giving focus to a window of an application, wherein:
  the user selected the application from the list of active applications; and
  a computing device autonomously selected the window from the windows of the application.

3. The method of claim 2, wherein giving focus to the window of the application comprises the KVM switch autonomously selecting the one of the plurality of computing devices; wherein the window is generated by the one of the plurality of computing devices.

4. The method of claim 2, wherein giving focus to the window of the application comprises the user manually turning the KVM switch to the one of the plurality of computing devices.

5. The method of claim 1, wherein the displaying the list of active applications of the plurality of computing devices in response to a command from the user comprises displaying a list of active applications of the plurality of computing devices in response to an Alt-Tab keyboard combination entered by the user.

6. The method of claim 1, wherein detecting applications requesting attention from a user comprises the KVM switch automatically detecting applications requesting attention from a user via an audio signal.

7. The method of claim 1, wherein detecting applications requesting attention from a user comprises the KVM switch automatically detecting applications requesting attention from a user via flashing an icon on a title bar, the icon representing the application.

8. The method of claim 1, wherein detecting applications requesting attention from a user comprises the KVM switch automatically detecting applications requesting attention from a user via flashing a window of the application.

9. A computer system to monitor applications active on a plurality of computing devices, the system comprising:
  a keyboard video mouse (KVM) switch to connect the plurality of computing devices;
  first program instructions to detect applications active on the computing devices, the detecting comprising detecting applications requesting attention from a user;
  second program instructions to time stamp the requesting attention from the user; and
  third program instructions to display a list of active applications of the plurality of computing devices in response to a command from the user, wherein the displaying comprises giving priority to the applications requesting attention from a user, the giving priority comprising ordering the display of the list of active applications by time stamp.

10. The computer system of claim 9, wherein the third program instructions comprise program instructions to display a list of windows of active applications.

11. A computer program product to monitor applications active on one or more of a plurality of computing devices, the computer program product comprising a non-transitory computer readable medium having a computer readable program, the computer readable program comprising:
  first program instructions to connect a plurality of computing devices via a keyboard video mouse (KVM) switch;
  second program instructions to detect applications active on the computing devices, the detecting comprising detecting applications requesting attention from a user
  third program instructions to time stamp the requesting attention from a user; and
  fourth program instructions to display a list of active applications of the plurality of computing devices in response to a command from the user, wherein the displaying comprises giving priority to the applications requesting attention from the user, the giving priority comprising ordering the display of the list of active applications by time stamp.

12. The computer program product of claim 11, wherein the computer
  readable program further comprises fifth program instructions to give focus to a window of an application selected by the user from the list of active applications.

13. The computer program product of claim 11, wherein the computer readable program further comprises:
  fifth program instructions to give focus to a window of an application selected by the user from the list of active applications; and
  sixth program instructions to autonomously select the one of the plurality of computing devices, wherein the window is generated by the one of the plurality of computing devices.

14. The computer program product of claim 11, wherein the second program instructions comprise program instructions to detect applications requesting attention from a user via flashing an icon on a title bar, the icon representing the application.

15. The method of claim 1, wherein the giving priority comprises making entries on the list of applications more noticeable for the applications requesting attention from the user.

16. The method of claim 15, wherein the making an entry for an application more noticeable comprises:
  representing the application by an icon; and
  using a bright color for the border of the icon.

17. The method of claim 15, wherein the making an entry for an application more noticeable comprises:
  representing the application by an icon; and
  flashing the icon.

* * * * *